US011244188B2

(12) United States Patent
Cholakkal et al.

(10) Patent No.: US 11,244,188 B2
(45) Date of Patent: Feb. 8, 2022

(54) DENSE AND DISCRIMINATIVE NEURAL NETWORK ARCHITECTURES FOR IMPROVED OBJECT DETECTION AND INSTANCE SEGMENTATION

(71) Applicant: Inception Institute of Artificial Intelligence, Ltd., Abu Dhabi (AE)

(72) Inventors: Hisham Cholakkal, Abu Dhabi (AE); Jiale Cao, Tianjin (CN); Rao Muhammad Anwer, Abu Dhabi (AE); Fahad Shahbaz Khan, Abu Dhabi (AE); Yanwei Pang, Tianjin (CN); Ling Shao, Abu Dhabi (AE)

(73) Assignee: Inception Institute of Artificial Intelligence, Ltd., Abu Dhabi (AE)

( * ) Notice: Subject to any disclaimer, the term of this patent is extended or adjusted under 35 U.S.C. 154(b) by 35 days.

(21) Appl. No.: 16/845,343

(22) Filed: Apr. 10, 2020

(65) Prior Publication Data
US 2021/0319242 A1 Oct. 14, 2021

(51) Int. Cl.
*G06K 9/62* (2006.01)
*G06K 9/32* (2006.01)
(Continued)

(52) U.S. Cl.
CPC .......... *G06K 9/3233* (2013.01); *G06K 9/0063* (2013.01); *G06K 9/6232* (2013.01);
(Continued)

(58) Field of Classification Search
CPC .. G06K 9/3233; G06K 9/6267; G06K 9/0063; G06K 9/6232; G06N 3/08; G06N 3/04
See application file for complete search history.

(56) References Cited

U.S. PATENT DOCUMENTS 10,726,306 B1 * 7/2020 Yang ................... G06K 9/00671
11,048,266 B2 * 6/2021 Jeon ........................... G06T 7/11
(Continued)

OTHER PUBLICATIONS

Taylor Mordan, "Deformable part based fully convolution network for object detection" (Year: 2017).*
(Continued)

*Primary Examiner* — Dhaval V Patel
(74) *Attorney, Agent, or Firm* — Bryan Cave Leighton Paisner LLP

(57) ABSTRACT

This disclosure relates to improved techniques for performing computer vision functions, including common object detection and instance segmentation. The techniques described herein utilize neural network architectures to perform these functions in various types of images, such as natural images, UAV images, satellite images, and other images. The neural network architecture can include a dense location regression network that performs object localization and segmentation functions, at least in part, by generating offset information for multiple sub-regions of candidate object proposals, and utilizing this dense offset information to derive final predictions for locations of target objects. The neural network architecture also can include a discriminative region-of-interest (RoI) pooling network that performs classification of the localized objects, at least in part, by sampling various sub-regions of candidate proposals and performing adaptive weighting to obtain discriminative features.

20 Claims, 5 Drawing Sheets

(51) Int. Cl.
    *G06N 3/08*       (2006.01)
    *G06K 9/00*       (2006.01)
    *G06N 3/04*       (2006.01)

(52) U.S. Cl.
    CPC ............. *G06K 9/6267* (2013.01); *G06N 3/04* (2013.01); *G06N 3/08* (2013.01)

(56) References Cited

U.S. PATENT DOCUMENTS

| | | | |
|---|---|---|---|
| 2018/0108137 A1* | 4/2018 | Price | G06T 7/11 |
| 2020/0026956 A1* | 1/2020 | Kumar | G06K 9/3233 |
| 2020/0175375 A1* | 6/2020 | Chen | G06T 7/174 |

OTHER PUBLICATIONS

Cai, et al. "Cascade R-CNN: Delving into high quality object detection," Proc. IEEE Conf. Computer Vision and Pattern Recognition, 2018.
Chen, et al. "Hybrid task cascade for instance segmentation," Proc. IEEE Conf. Computer Vision and Pattern Recognition, 2019.
Chen, et al. "Masklab: Instance segmentation by refining object detection with semantic and direction features," Proc. IEEE Conf. Computer Vision and Pattern Recognition, 2018.
Dai, et al. "Instance-aware semantic segmentation via multi-task network cascades," Proc. IEEE Conf. Computer Vision and Pattern Recognition, 2016.
Dai, et al. "Deformable convolutional networks," Proc. IEEE International Conf. Computer Vision, 2017.
Du, et al. "The unmanned aerial vehicle benchmark: Object detection and tracking," In Proc. European Conf. Computer Vision, 2018.
Duan, et al. "Centernet: Keypoint triplets for object detection," Proc. IEEE International Conf. Computer Vision, 2019.
Everingham, et al. "The pascal visual object classes (voc) challenge," International Journal of Computer Vision, 88 (2):303-338, 2010.
Gao, et al. "Lip: Local importance-based pooling," Proc. IEEE International Conf. Computer Vision, 2019.
Spyros, et al. "Attend refine repeat: Active box proposal generation via in-out localization," Proc. British Machine Vision Conference, 2016.
Ross Girshick, "Fast R-CNN," Proc. IEEE International Conf. Computer Vision, 2015.
Girshick, et al. "Rich feature hierarchies for accurate object detection and semantic segmentation," Proc. IEEE Conf. Computer Vision and Pattern Recognition, 2014.
He, et al. "Mask R-CNN," Proc. IEEE International Conf. Computer Vision, 2017.
He, et al. "Deep residual learning for image recognition," Proc. IEEE International Conf. Computer Vision, 2016.
Huang, et al. "Dense-box: Unifying landmark localization with end to end object detection," arXiv:1509.04874, 2015.
Huang, et al. "Mask scoring R-CNN," Proc. IEEE Conf. Computer Vision and Pattern Recognition, 2019.
Kong, et al. "Consistent optimization for single-shot object detection," arXiv:1901.06563, 2019.
Law, et al. "Cornernet: Detecting objects as paired keypoints," Proc. European Conf. Computer Vision, 2018.
Li, et al. "Scale-aware trident networks for object detection," Proc. IEEE International Conf. Computer Vision, 2019.
Li, et al. "Fully convolutional instance-aware semantic segmentation," Proc. IEEE Conf. Computer Vision and Pattern Recognition, 2017.
Lin, et al. "Feature pyramid networks for object detection," Proc. IEEE Conf. Computer Vision and Pattern Recognition, 2017.
Lin, et al. "Focal loss for dense object detection," Proc. IEEE International Conf. Computer Vision, 2017.
Lin, et al. "Microsoft COCO: Common objects in context," Proc. European Conf. Computer Vision, 2014.
Liu, et al. "Path aggregation network for instance segmentation," Proc. IEEE Conf. Computer Vision and Pattern Recognition, 2018.
Liu, et al. "SSD: Single shot multibox detector," Proc. European Conf. Computer Vision, 2016.
Lu, et al. "Grid R-CNN," Proc. IEEE Conf. Computer Vision and Pattern Recognition, 2019.
Lu, et al. "Grid R-CNN plus: Faster and better," arXiv:1906.05688, 2019.
Nie, et al. "Enriched feature guided refinement network for object detection," In The IEEE International Conference on Computer Vision, 2019.
Pang, et al. "Libra R-CNN: Towards balanced learning for object detection," Proc. IEEE Conf. Computer Vision and Pattern Recognition, 2019.
Pang, et al. "Efficient featurized image pyramid network for single shot detector," Proc. IEEE Conf. Computer Vision and Pattern Recognition, 2019.
Redmon, et al. "You only look once: Unified, real-time object detection," Proc. IEEE Conf. Computer Vision and Pattern Recognition, 2016.
Ren, et al. "Faster R-CNN: Towards real-time object detection with region proposal networks," Proc. Advances in Neural Information Processing Systems, 2015.
Singh, et al. "SNIPER: Efficient multi-scale training," Proc. Advances in Neural Information Processing Systems, 2018.
Tian, et al. "Fcos: Fully convolutional one-stage object detection," Proc. IEEE International Conf. Computer Vision, 2019.
Wang, et al. "Learning rich features at high-speed for single-shot object detection," Proc. IEEE International Conf. Computer Vision, 2019.
Wu, et al. "Delving into robust object detection from unmanned aerial vehicles: A deep nuisance disentanglement approach," In Proc. IEEE International Conf. Computer Vision, 2019.
Yang, et al. "Reppoints: Point set representation for object detection," Proc. IEEE International Conf. Computer Vision, 2019.
Zamir, et al. "iSAID: A large-scale dataset for instance segmentation in aerial images," In Proc. IEEE Conference on Computer Vision and Pattern Recognition Workshops, 2019.
Zhou, et al. "Bottom-up object detection by grouping extreme and center points," Proc. IEEE Conf. Computer Vision and Pattern Recognition, 2019.
Zhu, et al. "Feature selective anchor-free module for single-shot object detection," Proc. IEEE Conf. Computer Vision and Pattern Recognition, 2019.
Zhu, et al. "Deformable convnets v2: More deformable, better results," Proc. IEEE Conf. Computer Vision and Pattern Recognition, 2019.

* cited by examiner

DENSE AND DISCRIMINATIVE NEURAL NETWORK ARCHITECTURES FOR IMPROVED OBJECT DETECTION AND INSTANCE SEGMENTATION

TECHNICAL FIELD

This disclosure is related to improved techniques for performing computer vision functions and, more particularly, to techniques that utilize trained neural networks and artificial intelligence (AI) algorithms to perform object detection, instance segmentation, and other computer vision functions.

BACKGROUND

Generally speaking, object detection relates to computer vision technologies aimed at identifying locations of semantic objects of a certain class in digital images and/or videos. In many cases, object detection tasks can involve identifying locations of target objects using bounding boxes and/or instance segmentation, as well as classifying the identified target objects.

To accurately perform object detection and instance segmentation tasks, computer vision applications must account for a variety of technical problems. For example, one technical problem associated with implementing object detection and instance segmentation tasks relates to precisely localizing target objects (e.g., accurately identifying locations of target objects using bounding boxes and/or instance segmentation). Another technical problem associated with implementing object detection tasks relates to accurately recognizing whether objects belong to target semantic classes. Performance of these computer vision tasks can be particularly difficult in scenarios in which the target objects are partially hidden or heavily occluded, and/or in scenarios in which there are large intra-class variations (e.g., such that a single class includes objects that vary greatly) or diverse object categories (e.g., in situations where there are very large numbers of candidate object categories and the categories can vary greatly). Moreover, because many computer vision applications can be computationally expensive and resource intensive, additional challenges involve performing the object detection and instance segmentation tasks in a manner that is computationally efficient.

BRIEF DESCRIPTION OF DRAWINGS

To facilitate further description of the embodiments, the following drawings are provided, in which like references are intended to refer to like or corresponding parts, and in which.

DETAILED DESCRIPTION OF EXEMPLARY EMBODIMENTS

Figure 1:
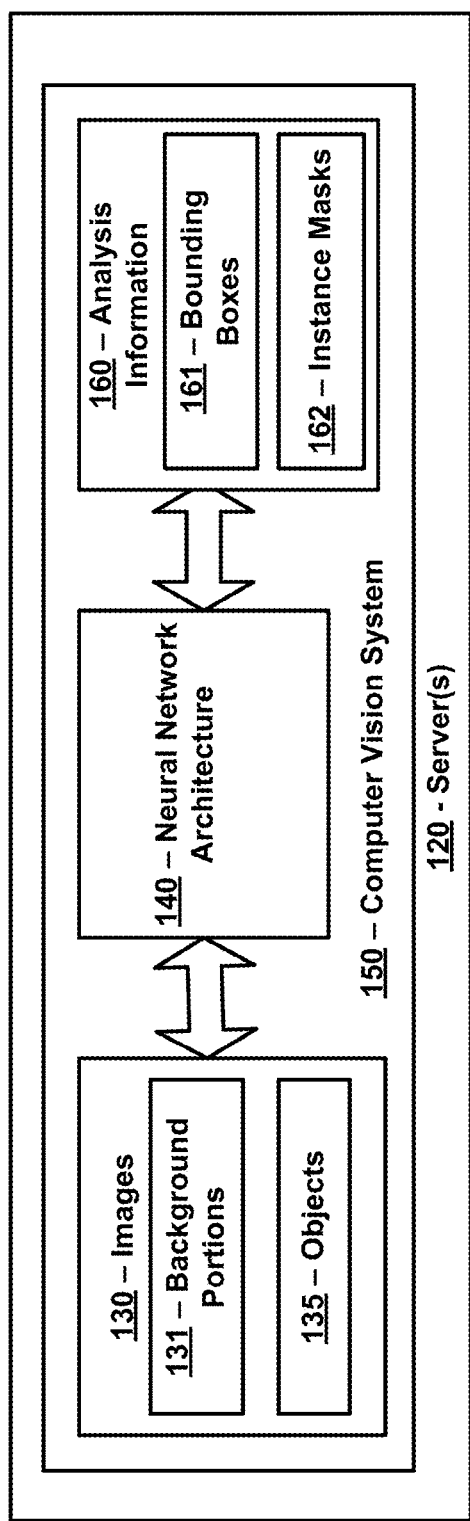
FIG. 1 is a diagram of an exemplary system for generating images in accordance with certain embodiments.
Figure 1:
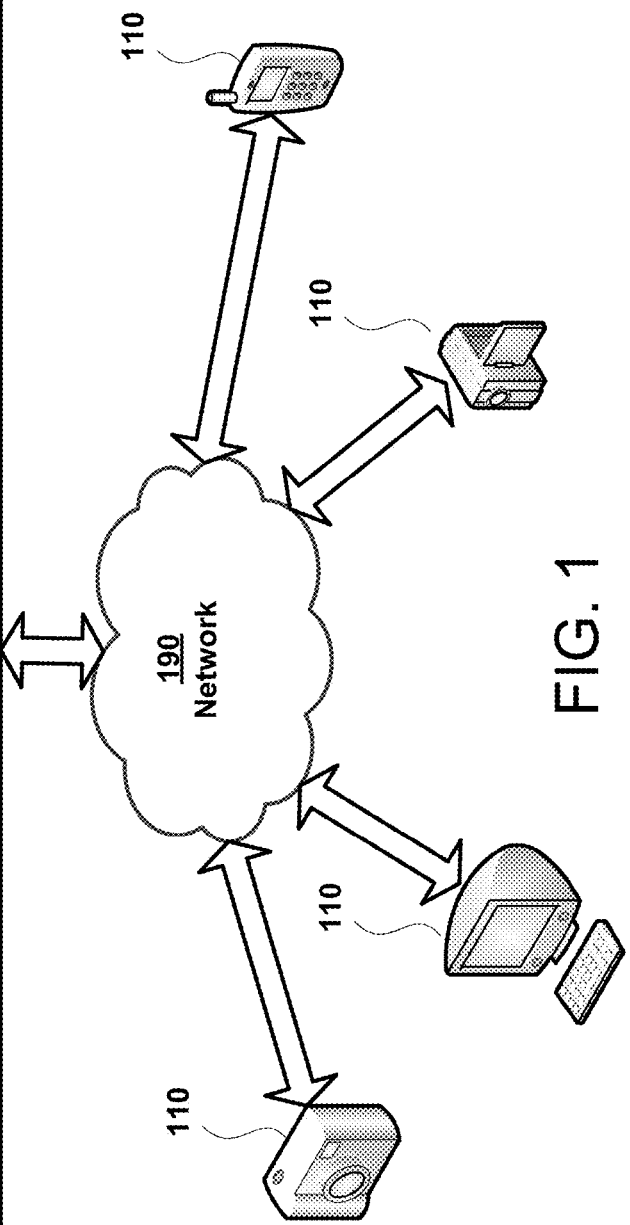

The present disclosure relates to systems, methods, and apparatuses that provide improved techniques for performing computer vision functions including, but not limited to, object detection and instance segmentation. A computer vision system includes a neural network architecture that is trained to perform these and other functions. In certain embodiments, the neural network architecture can perform object detection and/or instance segmentation functions, at least in part, by generating offset information for multiple sub-regions of candidate object proposals, and utilizing this dense offset information to derive final predictions for locations of target objects. The neural network architecture can further perform object and/or proposal classification functions, at least in part, by sampling various sub-regions of candidate proposals and performing adaptive weighting to enhance discriminative features. Using the techniques described herein, the neural network architecture is able to perform precise localization of target objects and classify the localized target objects with high accuracy.

In certain embodiments, the neural network architecture associated with the computer vision system comprises a region proposal network (RPN), an object localization network comprising a dense local regression network, and a classification network comprising a discriminative region-of-interest (RoI) pooling network. These components may be configured to execute some or all of the object detection functions (e.g., object localization and object classification functions) and instance segmentation functions described herein. In certain embodiments, the neural network architecture can include additional components and can execute additional computer vision functions as well.

Images received by the neural network architecture may initially be processed by the region proposal network. In response to receiving an image, the region proposal network can analyze the image and generate one or more proposals corresponding to potential locations of target objects in the image. In certain embodiments, the region proposal network can be implemented with an off-the-shelf deep learning network, such as a RPN used in Faster R-CNN and/or other similar network. The proposals generated by the region proposal network can be provided to both the dense local regression network, which is configured to improve object localization functions, and the classification network, which is configured to classify objects in the proposals of corresponding images.

In certain embodiments, the object localization network can include a dense local regression network that is configured to segment each proposal into a plurality of sub-regions and to derive dense offset information comprising multiple offsets corresponding to each of the sub-regions. Generally speaking, the offset information derived for each sub-region can indicate the distance of the sub-region from a bounding box and/or instance mask predicted for a candidate target object. Thus, in contrast to other approaches that may generate a single global offset for a candidate proposal, the dense local regression network can generate "dense" offset information comprising multiple offsets corresponding to the plurality of sub-regions of the candidate proposal. This dense offset information may then be utilized to more accurately and precisely generate a final prediction for the location of the target object included in the candidate proposal. In certain embodiments, the final predictions for target objects included in an image may include predicted locations of bounding boxes and/or instance masks that identify the target objects.

To further improve the accuracy of the object localization functions, the dense local regression network can generate binary overlap predictions corresponding to each sub-region of a candidate proposal. The binary overlap predictions can predict whether or not the sub-region belongs to a target object or a background portion of the image. Sub-regions that are predicted to be part of the target object are utilized to generate the final prediction for the target object, while sub-regions that are predicted to be part of the background portion of the image are not utilized to generate the final prediction for the target object. In this manner, the binary overlap predictions generated for a candidate proposal can be used to filter out background features that negatively impact the accuracy and precision of the final prediction for the location of the target object.

In certain embodiments, the dense local regression network described herein can generate localization predictions that precisely and accurately identify objects in images. In some embodiments, the localization predictions include predicted locations of bounding boxes that identify the objects, such that, for example, the four sides of the bounding boxes surround or enclose the targets. This can be accomplished, at least in part, by training the object localization network with training images annotated with bounding box annotations.

The dense local regression network described herein can additionally, or alternatively, perform instance segmentation functions to generate localization predictions that identify objects using instance masks. The instance masks identify precise boundaries of target objects (e.g., with pixel-level accuracy) included in the images. This can be accomplished, at least in part, by training the dense local regression network with training images annotated with ground-truth masks rather than, or in addition to, bounding box annotations. The ground-truth mask information can be utilized to train the binary overlap predictions and offset predictions generated for sub-regions of candidate proposals, and the binary overlap predictions during inference or testing can be utilized to provide instance mask predictions indicating whether or not sub-regions belong to target objects or background portions of the images. One or more deconvolution layers can also be added to the dense local regression network in order to increase the spatial resolution of the images, thus enabling more precise localization for performing instance segmentation.

The discriminative RoI pooling network associated with the classification network can also receive the candidate proposals from the region proposal network to perform object classification functions on the candidate proposals. The discriminative RoI pooling network can be configured to extract features from sub-regions of the candidate proposals, and to predict offsets for each sub-region using a light-weight offset predictor. The light-weight offset predictor can predict the offsets using far less parameters (e.g., ¼ of the parameters) than the offset predictions used in many other pooling approaches. In addition, the discriminative RoI pooling network can utilize an adaptive weighting function to assign higher weights to discriminative features in the sub-regions, which enhances the discriminative features and improves the accuracy of the classification functions.

The technologies discussed herein can be used in a variety of different contexts and environments. One useful application of these technologies is in the context of computer vision, which can be applied across a wide variety of different applications. For example, the technologies disclosed herein may be integrated into any application, device, or system that can benefit from object detection, object localization, object classification, and/or instance segmentation.

Another useful application of these technologies is in the context of automated, unmanned, and/or autonomous vehicles. For example, the technologies disclosed herein can be integrated into land-based vehicles (e.g., cars, trucks, etc.), water-based vehicles (e.g., boats, ships, submersibles, etc.), and/or air-based vehicles (e.g., drones, airplanes, aircrafts, etc.) that rely on automated, unmanned, and/or autonomous systems to control the vehicles. The technologies could be used to identify the presence and locations of other nearby vehicles, obstacles, and objects to assist these systems with safely controlling the automated, unmanned, and/or autonomous vehicles. Another useful application of these technologies is in the context of intelligent or automated traffic control systems. For example, the technologies disclosed herein can be integrated, or communicate, with a traffic control system that identifies and tracks vehicle locations and controls traffic conditions based on traffic patterns. Another useful application of these technologies is in the context of surveillance systems. For example, integrating these technologies into a surveillance system or application would permit the surveillance system to quickly determine the number and locations of individuals or objects (e.g., vehicles, weapons, or bags) that are present in an image or video feed. Another useful application of these technologies is in the image editing applications. For example, the technologies disclosed herein can assist image editing applications with accurately identifying and editing objects in images. Another useful application of these technologies is in the context of satellite imaging systems. For example, integrating these technologies into a satellite imaging system would permit the surveillance system to quickly identify and/or track target objects that may be present in an image or video feed captured by the satellite imaging system. The technologies discussed herein can also be applied to many other contexts as well.

As evidenced by the disclosure herein, the inventive techniques set forth in this disclosure are rooted in computer technologies that overcome existing problems in known computer vision systems, specifically problems dealing with object detection, object localization, object classification, and instance segmentation. The techniques described in this disclosure provide a technical solution (e.g., one that utilizes various AI-based neural networking and machine learning techniques) for overcoming the limitations associated with known techniques. For example, the image analysis techniques described herein take advantage of novel AI and machine learning techniques to generate and utilize dense offset information to more accurately perform object detection and/or instance segmentation. Likewise, the image analysis techniques described herein take advantage of novel AI and machine learning techniques to adaptively weight discriminative features of candidate proposals associated with images. This technology-based solution marks an improvement over existing capabilities and functionalities related to computer vision systems by improving the accuracy of the computer vision functions and reducing the information that is required to perform such functions.

In certain embodiments, a system is provided for performing computer vision functions. The system includes one or more computing devices comprising one or more processors and one or more non-transitory storage devices for storing instructions, wherein execution of the instructions by the one or more processors causes the one or more computing devices to: receive an image comprising an object at a neural network architecture; identify, using a region proposal network of the neural network architecture, at least one proposal corresponding to the object in the image; segment the at least one proposal into a plurality of sub-regions; generate, using a dense local regression network of the neural network architecture, separate offset information based on each of the plurality of sub-regions, wherein the offset information for each sub-region comprises a separate prediction for localizing the object in the image; and generate, using the dense local regression network of the neural network architecture, a final localization prediction for the object in the image based, at least in part, on the offset information generated for the plurality of sub-regions.

In certain embodiments, a method is provided for performing computer vision functions. The method comprises: receiving an image at a neural network architecture; identifying, using a region proposal network of the neural network architecture, at least one proposal corresponding to an object in the image; segmenting the at least one proposal into a plurality of sub-regions; generating, using a dense local regression network of the neural network architecture, separate offset information based on each of the plurality of sub-regions, wherein the offset information for each sub-region comprises a separate prediction for localizing the object in the image; and generating, using the dense local regression network of the neural network architecture, a final localization prediction for the object in the image based, at least in part, on the offset information generated for the plurality of sub-regions.

In certain embodiments, a computer program product is provided for performing computer vision functions. The computer program product comprises a non-transitory computer-readable medium including instructions for causing a computer to: receive an image comprising an object at a neural network architecture; identify, using a region proposal network of the neural network architecture, at least one proposal corresponding to the object in the image; segment the at least one proposal into a plurality of sub-regions; generate, using a dense local regression network of the neural network architecture, separate offset information based on each of the plurality of sub-regions, wherein the offset information for each sub-region comprises a separate prediction for localizing the object in the image; and generate, using the dense local regression network of the neural network architecture, a final localization prediction for the object in the image based, at least in part, on the offset information generated for the plurality of sub-regions.

The embodiments described in this disclosure can be combined in various ways. Any aspect or feature that is described for one embodiment can be incorporated to any other embodiment mentioned in this disclosure. Moreover, any of the embodiments described herein may be hardware-based, may be software-based, or, preferably, may comprise a mixture of both hardware and software elements. Thus, while the description herein may describe certain embodiments, features, or components as being implemented in software or hardware, it should be recognized that any embodiment, feature or component that is described in the present application may be implemented in hardware and/or software.

Embodiments may include a computer program product accessible from a computer-usable or computer-readable medium providing program code for use by or in connection with a computer or any instruction execution system. A computer-usable or computer-readable medium may include any apparatus that stores, communicates, propagates, or transports the program for use by or in connection with the instruction execution system, apparatus, or device. The medium can be a magnetic, optical, electronic, electromagnetic, infrared, or semiconductor system (or apparatus or device) or a propagation medium. The medium may include a computer-readable storage medium, such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

FIG. 1 is a diagram of an exemplary system 100 in accordance with certain embodiments. The system 100 comprises one or more computing devices 110 and one or more servers 120 that are in communication over a network 190. A computer vision system 150 is stored on, and executed by, the one or more servers 120. The network 190 may represent any type of communication network, e.g., such as one that comprises a local area network (e.g., a Wi-Fi network), a personal area network (e.g., a Bluetooth network), a wide area network, an intranet, the Internet, a cellular network, a television network, and/or other types of networks.

All the components illustrated in FIG. 1, including the computing devices 110, servers 120, and computer vision system 150 can be configured to communicate directly with each other and/or over the network 190 via wired or wireless communication links, or a combination of the two. Each of the computing devices 110, servers 120, and computer vision system 150 can also be equipped with one or more transceiver devices, one or more computer storage devices (e.g., RAM, ROM, PROM, SRAM, etc.), and one or more processing devices (e.g., central processing units) that are capable of executing computer program instructions. The computer storage devices can be physical, non-transitory mediums.

In certain embodiments, the computing devices 110 may represent desktop computers, laptop computers, mobile devices (e.g., smart phones, personal digital assistants, tablet devices, vehicular computing devices, or any other device that is mobile in nature), and/or other types of devices. The one or more servers 120 may generally represent any type of computing device, including any of the computing devices 110 mentioned above. In certain embodiments, the one or more servers 120 comprise one or more mainframe computing devices that execute web servers for communicating with the computing devices 110 and other devices over the network 190 (e.g., over the Internet).

In certain embodiments, the computer vision system 150 is stored on, and executed by, the one or more servers 120. The computer vision system 150 can be configured to perform any and all operations associated with analyzing images 130 and/or executing computer vision functions including, but not limited to, functions for performing object detection, object localization, object classification, and instance segmentation (e.g., which may include identifying precise locations of objects 135 in the images 130 with pixel-level accuracy).

The images 130 provided to, and analyzed by, the computer vision system 150 can include any type of image. In certain embodiments, the images 130 can include one or more two-dimensional (2D) images. In certain embodiments, the images 130 may include one or more three-dimensional (3D) images. The images 130 may be captured in any digital or analog format, and using any color space or color model. Exemplary image formats can include, but are not limited to, JPEG (Joint Photographic Experts Group), TIFF (Tagged Image File Format), GIF (Graphics Interchange Format), PNG (Portable Network Graphics), etc. Exemplary color spaces or models can include, but are not limited to, sRGB (standard Red-Green-Blue), Adobe RGB, gray-scale, etc.

The images 130 received by the computer vision system 150 can be captured by any type of camera device. The camera devices can include any devices that include an imaging sensor, camera, or optical device. For example, the camera devices may represent still image cameras, video cameras, and/or other devices that include image/video sensors. The camera devices also can include devices that comprise imaging sensors, cameras, or optical devices and which are capable of performing other functions unrelated to capturing images. For example, the camera devices can include mobile devices (e.g., smart phones or cell phones), tablet devices, computing devices, desktop computers, etc. The camera devices can be equipped with analog-to-digital (A/D) converters and/or digital-to-analog (D/A) converters based on the configuration or design of the camera devices. In certain embodiments, the computing devices 110 shown in FIG. 1 can include any of the aforementioned camera devices, or other types of camera devices.

Each of the images 130 (or the corresponding scenes captured in the images 130) can include one or more objects 135. Generally speaking, any type of object may be included in an image 130, and the types of objects 135 included in an image 130 can vary greatly. The objects 135 included in an image 130 may correspond to various types of inanimate articles (e.g., vehicles, beds, desks, windows, tools, appliances, industrial equipment, curtains, sporting equipment, fixtures, etc.), living things (e.g., human beings, animals, plants, etc.), structures (e.g., buildings, houses, etc.), and/or the like. For example, an image 130 of a traffic intersection or road may include objects 135 corresponding to vehicles, individuals, and/or other objects. Similarly, an image 130 of a bedroom may include objects 135 corresponding to a bed, desk, dresser, and/or other objects. Likewise, an image 130 of a playground may include objects 135 corresponding to a swing set, a basketball hoop, sports equipment, children, and/or other objects.

Each of the images 130 may also include a background portion 131. In some cases, the background portion 131 of an image 130 may represent scenery or content that is not included in a foreground of an image 130. Additionally, or alternatively, the background portion 131 of an image 130 may represent any portion of an image 130 that does not correspond to objects 135 that are the target of the computer vision functions described herein. Additionally, or alternatively, the background portion 131 of an image 130 may represent any portion of an image 130 that is located outside of bounding boxes, instance masks, and/or other annotations that identify objects 135 in the image.

The images 130 received by the computer vision system 150 can be provided to the neural network architecture 140 for processing and/or analysis. In certain embodiments, the neural network architecture 140 may comprise a convolutional neural network (CNN), or a plurality of convolutional neural networks. Each CNN may represent an artificial neural network, and may be configured to analyze images 130 and to execute deep learning functions and/or machine learning functions on the images 130. Each CNN may include a plurality of layers including, but not limited to, one or more input layers, one or more output layers, one or more convolutional layers (e.g., that include learnable filters), one or more ReLU (rectifier linear unit) layers, one or more pooling layers, one or more fully connected layers, one or more normalization layers, etc. The configuration of the CNNs and their corresponding layers enable the CNNs to learn and execute various functions for analyzing, interpreting, and understanding the images 130.

In certain embodiments, the neural network architecture 140 can be trained to perform one or more computer vision functions to analyze the images 130. For example, the neural network architecture 140 can be trained to analyze an image 130 to perform object detection functions, which may include predicting or identifying locations of objects 135 (e.g., using bounding boxes) associated with one or more target classes in the images 130. In some cases, the object detection functions executed by the neural network architecture can include instance segmentation functions, which may include predicting or identifying precise locations of objects 135 in the images 130 (e.g., with pixel-level accuracy). The neural network architecture 140 also can be trained to analyze an image 130 to perform object classification functions, which may include predicting or determining whether objects 135 in the images 130 belong to one or more target semantic classes and/or predicting or determining labels for the objects 135 in the images 130. The neural network architecture 140 can be trained to perform other types of computer vision functions (e.g., object counting) as well.

The neural network architecture 140 of the computer vision system 150 is configured to generate and output analysis information 160 based on an analysis of the images 130. The analysis information 160 for an image 130 can generally include any information or data associated with analyzing, interpreting, understanding, and/or classifying the images 130 and the objects 135 included in the images 130. In certain embodiments, the analysis information 160 can include information or data that indicates the results of the computer vision functions performed by the neural network architecture 140. For example, the analysis information 160 may include the predictions and/or results associated with performing object detection, object localization, object classification, instance segmentation, and/or other functions.

The analysis information 160 can further include data that indicates the locations of the objects 135 identified in the image 130. For example, the analysis information 160 for an image 130 can include an annotated version of the image that identifies predicted locations of target objects 135 in the image using bounding boxes 161. In such embodiments, the analysis information 160 can include offset information that can be used to identify or derive locations of the bounding boxes 161 (e.g., the four sides of each bounding box). Additionally, or alternatively, the analysis information 160 for an image 130 can include an annotated version of the image that identifies precise boundaries of the objects 135 (e.g., annotations surrounding the perimeters, edges, or boundaries of the objects and/or annotations that highlight the objects 135 included within the perimeters, edges, or boundaries of the objects 135) and/or instance masks 162 identifying objects 135. Additionally, or alternatively, the analysis information 160 can include other types of data or information for identifying the locations of objects 135 (e.g., such as coordinates of the objects 135 and/or masks identifying locations of objects 135).

In certain embodiments, the analysis information 160 can also include data and information indicating the results of classification functions performed on the images 130. For example, the analysis information 160 may indicate labels assigned to the objects 135 and/or may indicate whether each of the objects 135 belongs to one or more target classes. Other types of analysis information 160 can be output by the neural network architecture 140 as well.

In the exemplary system 100 shown in FIG. 1, the computer vision system 150 may be stored on, and executed by, the one or more servers 120. In other exemplary systems, the computer vision system 150 can additionally, or alternatively, be stored on, and executed by, the computing devices 110 and/or other devices. For example, in certain embodiments, the computer vision system 150 can be integrated directly into a camera device to enable the camera device to analyze images using the techniques described herein. Likewise, the computer vision system 150 can also be stored as a local application on a computing device 110, or integrated with a local application stored on a computing device 110, to implement the techniques described herein. For example, in certain embodiments, the computer vision system 150 can be integrated with (or can communicate with) various applications including, but not limited to, automated vehicle applications, intelligent traffic applications, surveillance applications, image editing applications, social media applications, and/or other applications that are stored on a computing device 110 and/or server 120.

In certain embodiments, the one or more computing devices 110 can enable individuals to access the computer vision system 150 over the network 190 (e.g., over the Internet via a web browser application). For example, after a camera device (e.g., which may be directly integrated into a computing device 110 or may be a device that is separate from a computing device 110) has captured one or more images 130, an individual can utilize a computing device 110 to transmit the one or more images 130 over the network 190 to the computer vision system 150. The computer vision system 150 can analyze the one or more images 130 using the techniques described in this disclosure. The analysis information 160 generated by the computer vision system 150 can be transmitted over the network 190 to the computing device 110 that transmitted the one or more images 130 and/or to other computing devices 110.

Figure 2:
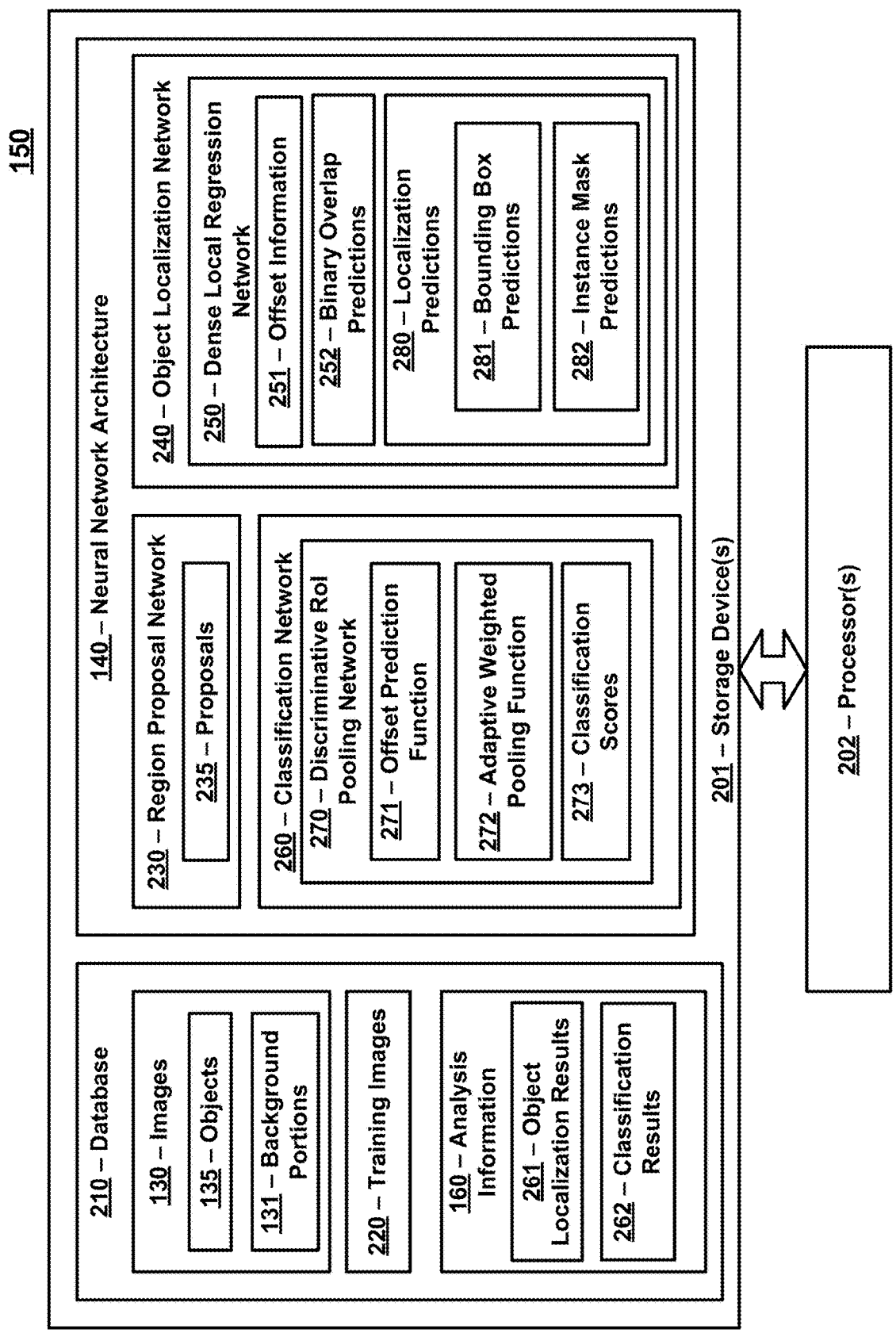
FIG. 2 is a block diagram of an exemplary computer vision system in accordance with certain embodiments.

FIG. 2 is a block diagram of a computer vision system 150 in accordance with certain embodiments of the present invention. The computer vision system 150 includes one or more storage devices 201 that are in communication with one or more processors 202. The one or more storage devices 201 can include: i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage devices 201 can comprise (i) non-transitory memory and/or (ii) transitory memory. The one or more processors 202 can include one or more graphical processing units (GPUs), central processing units (CPUs), controllers, microprocessors, digital signal processors, and/or computational circuits. The one or more storage devices 201 can store data and instructions associated with one or more databases 210 and a neural network architecture 140 that includes a region proposal network 230, an object localization network 240 comprising a dense local regression network 250, and a classification network 260 comprising a discriminative RoI pooling network 270. The one or more processors 202 are configured to execute instructions associated with these components. Each of these components is described in further detail below.

The database 210 stores the images 130 that are provided to and/or analyzed by the computer vision system 150, as well the analysis information 160 that is generated by the computer vision system 150. The database 210 also stores a set of training images 220 that are utilized to train the neural network architecture 140. Exemplary training images 220 that may be used to train the neural network architecture 140 can include images included in the MS COCO (Microsoft Common Objects in Context) dataset, iSAID (Instance Segmentation in Aerial Images Dataset) dataset, UAVDT (Unmanned Aerial Vehicle: Object Detection and Tracking) dataset, Pascal VOC (Visual Object Classes) dataset, and/or other datasets.

The training images 220 may be annotated with ground-truth information.

In certain embodiments, the ground-truth information may include, or identify locations of, bounding boxes that indicate locations of objects 135 in the training images 220. The ground-truth information may additionally, or alternatively, include instance masks and/or pixel-level annotations indicating locations of objects 135 in the training images 220. The ground-truth information may further include annotations that classify the objects 135 depicted in each of the training images 220. For example, the annotations may identify one or more semantic classes and/or labels that apply to each of the objects 135 in the training images 220.

In certain embodiments, the neural network architecture 140 includes a region proposal network (RPN) 230 and an object detection network, which comprises an object localization network 240 and a classification network 260. The region proposal network 230 can be configured to analyze images 130 and generate one or more proposals 235 corresponding to potential locations of target objects in each of the images 130. In certain embodiments, the region proposal network 230 can be implemented with a pre-trained deep learning network, such as Faster R-CNN and/or other similar networks. The proposals 235 generated by the region proposal network 230 for each image 130 can identify potential locations of target objects in the images 130. For example, each proposal 235 may correspond to a subset or portion of an image 130 that potentially includes a target object 135, and the region proposal network 230 may generate multiple proposals 235 for each of the images 130.

The proposals 235 generated by the region proposal network 230 can be provided to the object localization network 240 and the classification network 260. The object localization network 240 can utilize the proposals 235 to generate analysis information 160, including object localization results 261. The object localization results 261 can identify locations of any target objects 135 in the images 130 using bounding boxes 161 and/or pixel-level annotations (e.g., instance masks 162). The classification network 260 can utilize the proposals 235 to generate analysis information 160, including classification results 262. The classification results 262 can include information associated with classifying the objects in the images 130 and/or assigning labels to the objects 135 in the images 130.

In certain embodiments, the object localization network 240 can include a dense local regression network 250 that generates offset information 251 for each of the proposals 235 generated by the region proposal network 230. In certain embodiments, upon receiving a proposal 235, the dense local regression network 250 may divide the proposal 235 into a plurality of sub-regions and generate separate offset information 251 for each sub-region.

For embodiments that use bounding boxes 161 to localize objects 135, the offset information 251 derived from each sub-region may include box offset information that identifies or predicts the left, right, top, and bottom portions of a bounding box 161 corresponding to the potential object 135 associated with the proposal 235. For example, the offset information 251 can identify or predict the distance between the sub-region and the left, right, top, and bottom portions of a bounding box 161. Additionally, or alternatively, the offset information 251 for each sub-region may include information that can be used to derive the predictions for the left, right, top, and bottom portions of a bounding box 161 corresponding to the potential object 135 associated with the proposal 235. For example, in certain embodiments, the offset information 251 may predict the distance between a sub-region and two corners of the bounding box 161 (e.g., the top-left and bottom-right corners or the top-right and bottom-left corners of the bounding box), and the predicted locations of the bounding box corners may be used to derive the predictions for the left, right, top, and bottom portions of the bounding box 161. For embodiments that use instance segmentation functions to localize objects 135 (e.g., using instance masks 162), the offset information 251 for each sub-region may include information that identifies or predicts locations of bounding boxes surrounding the instance masks of potential objects 135 associated with the proposal 235.

In view of the above, the dense local regression network 250 can generate "dense" offset information 251 that comprises multiple offset predictions for a proposal 235. The multiple offset predictions can then be combined to derive a final localization prediction 280 for each proposal 235. For embodiments that utilize bounding boxes 161 to localize objects 135 in images 130, the localization predictions 280 generated by the dense local regression network 250 can include bounding box predictions 281 that utilize multiple box offset predictions to identify or predict locations of bounding boxes 161 surrounding the objects 135. For embodiments that utilize instance segmentation functions to localize objects 135 in images 130, the localization predictions 280 generated by the dense local regression network 250 can include instance mask predictions 282 that utilize multiple mask offset predictions to identify or predict locations of bounding boxes surrounding the instance masks 162 and a binary overlap prediction 252 to predict the instance mask 162 of the identifying the objects 135.

In certain embodiments, the localization prediction 280 for each proposal 235 can be derived by averaging the offset predictions generated for each sub-region of a proposal 235. The use of the dense offset information 251 allows the dense local regression network 250 to generate localization predictions 280 with greater accuracy in comparison to other approaches that utilize a single global offset for a given candidate proposal.

In many cases, proposals 235 received from the region proposal network 230 may include portions that correspond to the background of image 130 and it can be beneficial to avoid consideration of these background portions 131 in generating the localization predictions 280. To address this issue, the dense local regression network 250 may further improve the accuracy of the localization predictions 280 by generating binary overlap predictions 252 for each sub-region of the proposals 235. The binary overlap predictions 252 can predict or determine whether a sub-region of a proposal 235 belongs to an object 135 in an image 130 or belongs to a background portion 131 of the image 130. If a sub-region of a proposal 235 is predicted or determined to be part of a background portion 131 of an image 130, then the sub-region can be ignored and the dense local regression network 250 will not utilize box offset information 251 associated with the sub-region to generate the final localization prediction 280 for the proposal 235.

For embodiments that utilize bounding boxes 161 to localize objects 135 in the images 130, anything included within the bounding boxes 161 may be considered part of the object 135 for the purposes of generating the binary overlap predictions 252, and anything included outside of the bounding box 161 may be considered a background portion 131 of the proposal 235. For embodiments that utilize instance masks 162 to localize objects 135 in the images 130, anything included within the instance mask boundaries may be considered part of the object 135 for the purposes of generating the binary overlap predictions 252, and anything included outside of the instance mask boundaries may be considered a background portion 131 of the proposal 235.

In certain embodiments, each binary overlap prediction 252 may correspond to a predicted probability (e.g., in a range of 0 to 1) that a corresponding sub-region belongs to an object 135 and, thus, is not included in a background portion 131 of the proposal 235. The predicted probability for the sub-region can be compared to a threshold (e.g., 0.5 in some cases). The offset information 251 generated for the sub-region may be considered in generating the localization prediction 280 (e.g., the bounding box prediction 281 and/or instance mask prediction 282) if the predicted probability exceeds the threshold. The offset information 251 for the sub-region may not be considered (and may be ignored) in generating the localization prediction 280 if the predicted probability does not exceed the threshold.

The proposals 235 generated by the region proposal network 230 are also provided to the classification network 260. The classification network 260 utilizes the proposals 235 to generate classification results 262. The classification results 262 for each proposal 235 can include predictions indicating whether the proposal 235 includes an object 135 in a target class (or a plurality of target classes). The classification results 262 may further include predicted labels for the objects 135 identified in each of the proposals 235.

In certain embodiments, the classification network 260 can include a discriminative RoI pooling network 270 to assist with more accurately performing classification functions. The discriminative RoI pooling network 270 can be configured to extract features from various sub-regions of a candidate proposal 235, and to execute an adaptive weighted pooling function that enhances discriminative features by assigning higher weights to sub-regions including discriminative features.

For example, in certain embodiments, the discriminative RoI pooling network 270 may execute an offset prediction function 271 to predict offsets for each proposal sub-region.

The offset prediction function 271 may first utilize a RoIAlign operation to obtain a fixed-sized representation of each proposal 235 received from the region proposal network 230. The fixed-sized representation of each candidate proposal 235 may be divided or segmented into a plurality of sub-regions, and features may be extracted from each of the sub-regions. While certain approaches may utilize an RoIAlign operation to predict offsets by obtaining features from k×k sub-regions and then passing these features through three fully-connected layers, the offset prediction function 271 can utilize a "light-weight" offset prediction approach that only uses a $$\frac{k}{2} \times \frac{k}{2}$$

sized RoIAlign followed by two fully-connected layers (and, thus, is light-weight due to the smaller input vector).

After offset prediction, the discriminative RoI pooling network 270 can execute an adaptive weighted pooling function 272 that assigns weights to sampling points obtained within each of the proposal sub-regions. The sampling points with more discriminative features can be assigned higher weights in comparison to the sampling points with less discriminative features. Dynamically assigning weights to the sampling points obtained from the sub-regions based on the discriminative features improves classification accuracy compared to other approaches (e.g., such as deformable RoI pooling approaches that employ a RoIAlign operation in which all sampling points obtained within each sub-region are averaged by assigning them equal weights).

The discriminative RoI pooling network 270 further utilizes the fixed-sized representations of the candidate proposals 235 to calculate classification scores 273 for the proposals 235. The classification score 273 generated for each proposal 235 may indicate a probability that the proposal 235 includes an object 135 associated with a particular class or label. In certain embodiments, multiple classification scores 273 may be generated for each proposal 235, each indicating a probability that the proposal 235 includes an object 135 associated with a separate class or label.

In certain embodiments, the classification scores 273 may be utilized to filter the proposals 235 that are provided to the object localization network 240 (e.g., dense local regression network 250). For example, in certain embodiments, the object localization network 240 and/or dense local regression network 250 only receives and analyzes proposals 235 that have been assigned a classification score 273 above a predetermined threshold.

Exemplary embodiments of the computer vision system 150 and the aforementioned sub-components (e.g., database 210, neural network architecture 140, object localization network 240, dense local regression network 250, classification network 260, discriminative RoI pooling network 270, etc.) are described in further detail below. While the sub-components of the computer vision system 150 may be depicted in FIG. 2 as being distinct or separate from one other, it should be recognized that this distinction may be a logical distinction rather than a physical distinction. Any or all of the sub-components can be combined with one another to perform the functions described herein, and any aspect or feature that is described as being performed by one sub-component can be performed by any or all of the other sub-components. Also, while the sub-components of the computer vision system 150 may be illustrated as being implemented in software in certain portions of this disclosure, it should be recognized that the sub-components described herein may be implemented in hardware and/or software.

Figure 3:
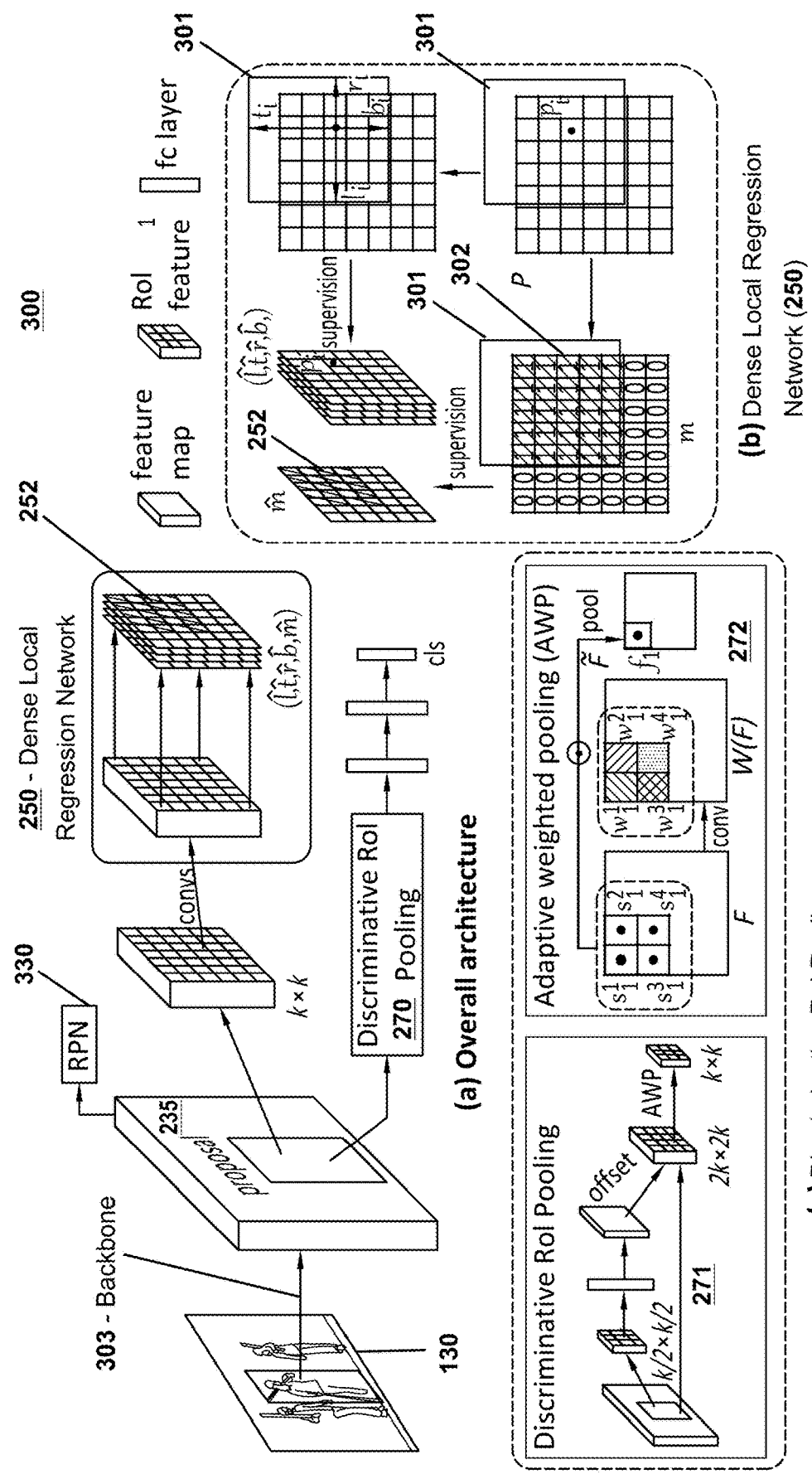
FIG. 3 is a diagram illustrating an exemplary architecture for a computer vision system in accordance with certain embodiments.

FIG. 3 is a diagram illustrating an exemplary architecture 300 for a computer vision system 150 in accordance with certain embodiments. The architecture 300 illustrates, inter alia, exemplary configurations for a region proposal network 230, a dense local regression network 250, and a discriminative RoI pooling network 270. Section (a) provides details on the overall architecture of an exemplary computer vision system 150. The architecture utilizes a two-stage approach to perform object detection and classification. In the first stage, RoI features of each candidate proposal P (235) are generated by a region proposal network 230. In the second stage, the RoI features are provided to, and analyzed by, both a dense local regression network 250 and a discriminative RoI pooling network 270. Section (b) provides details on an exemplary implementation of the dense local regression network 250. Section (c) provides details on an exemplary implementation of the discriminative RoI pooling network 270.

In this exemplary architecture 300, the object detection, localization, and classification techniques described herein are utilized to improve the standard Faster R-CNN framework. In particular, the dense local regression network 250 replaces the traditional box offset regression of Faster R-CNN, while the classification is improved with a discriminative RoI pooling network 270. The description that follows explains how the techniques described herein can be applied to localize objects 135 in images 130 using bounding boxes 161 and also to perform object classification functions. It is then explained how these techniques can be extended to perform instance segmentation on images 130. It should be recognized that the techniques described herein can be applied to improve other neural networks as well, such as those that perform object detection (e.g., object localization and object classification) and/or instance segmentation.

The region proposal network 230 extracts or generates RoI features for each candidate proposal P. The RoI features are passed to two different branches: the dense local regression network 250 and the discriminative RoI pooling network 270. Rather than treating each RoI feature as a single global vector, the dense local regression network 250 treats them as k×k local features extracted from k×k sub-regions within the RoI feature. These local features can be used to predict multiple dense box offsets, implying each local feature $p_i \in P$ predicts its own dense box offsets $(\hat{l}_i, \hat{t}_i, \hat{r}_i, \hat{b}_i)$. To reduce the influence of background features, a binary overlap prediction $\hat{m}$ (252) is utilized that classifies each local feature as either belonging to ground-truth bounding-box G (301) or background portion 131. To train $\hat{m}$, the overlapping region m (302) between G and P is assigned one (m=1). For classification, the discriminative RoI pooling network 270 first predicts the offsets of each RoI sub-region using a light-weight offset predictor, and then performs an adaptive weighting W(F) that assigns higher weights to the discriminative sampling points of an RoI.

In a two-stage detection framework, one objective of a bounding-box regression branch is to find the extreme left, top, right and bottom points of a tight bounding-box surrounding an object. Let $P(x_P, y_P, w_P, h_P)$ be a candidate object proposal 235, and $G(x_G, y_G, h_G)$ be the target ground-truth box. The traditional regression in Faster R-CNN predicts a single box offset ($\Delta_x, \Delta_y, \Delta_w, \Delta_h,$) as:

$$\Delta_x=(x_G-x_P)/w_P \; \Delta_y=(y_G-y_P)/h_P$$

$$\Delta_w=(\log w_G/w_P) \; \Delta_h=(\log h_G/h_P), \quad (1)$$

where:

$(x_P, y_P)$ and $(x_G, y_G)$ indicate box centers of proposal P and ground-truth G, respectively;

$(w_P, h_P)$ and $(w_G, h_G)$ represent the width and height of a given proposal P and ground-truth bounding box G, respectively; and "log" is the logarithmic function.

For each candidate proposal P, feature pooling strategies, such as RoIPool or RoIAlign, can be used to obtain the corresponding fixed-sized (k×k) RoI feature from equally spaced k×k sub-regions within the proposal 235. The standard Faster R-CNN treats these RoI features as a single vector, referred to herein as a global feature representation, and predicts a single box offset by passing them through several fully connected layers.

Different from the aforementioned strategy, the dense local regression network 250 considers the k×k dimensional RoI feature as $k^2$ spatially adjacent local features. One such local feature is shown as $p_i$ in Section (b) of FIG. 2. These local RoI features are then used to predict multiple box offsets, referred to herein as dense box offsets, by passing through a fully convolutional network. The dense box offsets predict the distance of each local feature $p_i$ at location $(x_i, y_i)$ to the top-left and bottom-right corners of the ground-truth bounding-box G. Let $(x_l, y_t)$ and $(x_r, y_b)$ represent the top-left and bottom-right corners of the ground-truth bounding-box, and $\hat{l}_i, \hat{t}_i, \hat{r}_i,$ and $\hat{b}_i$) represent the dense box offsets predicted by the local feature $p_i$ in left, top, right, and bottom directions, respectively (FIG. 2(b)). The corresponding ground-truth dense box offsets ($l_i, t_i, r_i, b_i$) at index location i, are computed as follows:

$$l_i=x_i-x_l/w_P \; t_i=y_i-y_t/h_P$$

$$r_i=x_r-x_i/w_P \; b_i=y_b-y_i/h_P \quad (2)$$

where $(x_i, y_i)$ is the location of local feature $p_i$.

The normalization factors $w_P$ and $h_P$ denote the width and height of the candidate proposal 235. In the dense local regression network 250, the error between the predicted and ground-truth dense box offsets can be minimized at each local feature $p_i$ inside the ground-truth bounding-box.

The number of sub-regions or local features of the candidate proposal 235 belonging to the ground-truth bounding-box depends on the overlap between the proposal 235 and its corresponding ground-truth bounding-box. Even in the case of higher overlap (majority of $k^2$ local features belonging to the ground-truth bounding-box), several unwanted features (e.g., background portions 131) are included among these $k^2$ local features of the candidate proposal 235. As a consequence, the dense box offsets predicted by these background features are less precise and are therefore desired to be ignored. Given such, a binary overlap prediction 252 is utilized by the dense local regression network 250 to classify each local feature as either belonging to either the ground-truth bounding-box region or a background portion 131 of the image 130. This binary overlap prediction 252 is performed by introducing an additional output $\hat{m}$, along with the dense box offsets. The local features in an overlapping region between the ground-truth bounding-box G and the candidate proposal P, can be assigned with a ground-truth label 1 as follows:

$$m_i = \begin{cases} 1, & \text{if } p_i \in G; \; \forall \, p_i \in P \\ 0, & \text{otherwise} \end{cases} \quad (3)$$

where $p_i$ is the local feature of proposal P.

In certain embodiments, ground-truth pixel-level instance mask that precisely indicates object regions may be unavailable. In such cases, it can be assumed that all regions inside the ground-truth bounding-box G correspond to the object 135. Note that $\hat{m}=\{\hat{m}_i:i\in[1, k^2]\}$ and $m=\{m_i:i\in[1, k^2]\}$. During training, the binary overlap prediction $\hat{m}_i$ at index location i can be passed through sigmoid normalization ($\sigma$) for computing the binary cross-entropy loss with the ground-truth label $m_i$. During inference, the dense local regression network 250 can predict five outputs, ($\hat{l}_i, \hat{t}_i, \hat{r}_i, \hat{b}_i, m_i$), at each local feature $p_i \in P$. In certain embodiments, only the predicted dense box offsets at positions where $\sigma(\hat{m}_i) > 0.5$ are used to compute the top-left and bottom-right corner points of the predicted box. The bounding boxes 161 predicted using the multiple local features can be averaged to obtain a single or final regressed bounding-box prediction 281 (which may be represented using top-left and bottom-right corner points).

Figure 4:
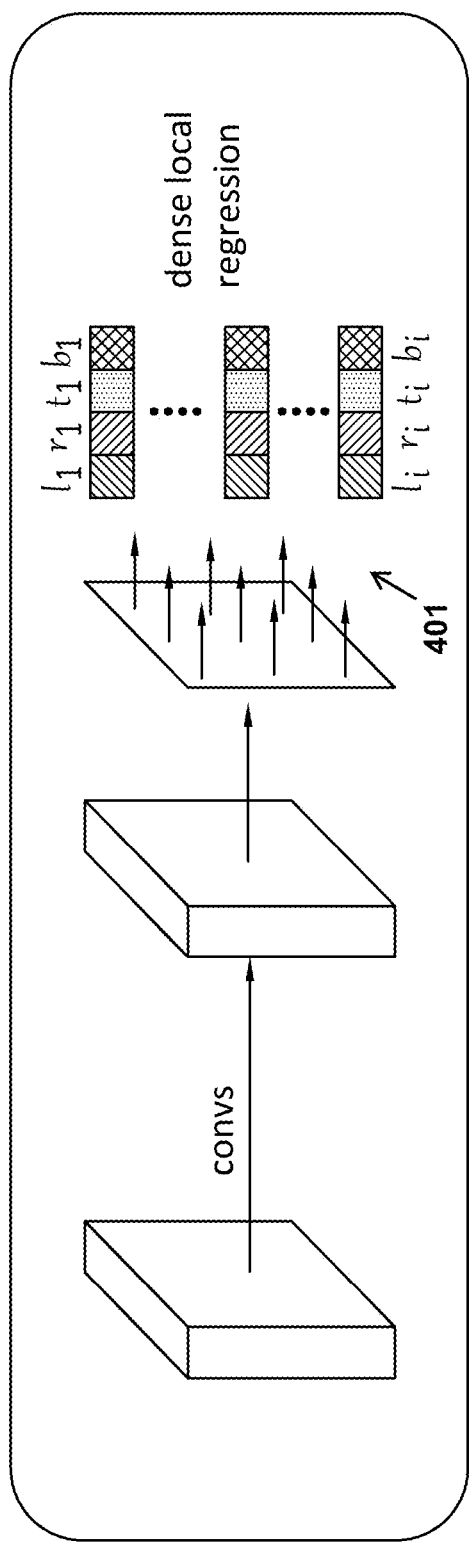
FIG. 4 is a diagram illustrating details of a dense local regression network in accordance with certain embodiments.

FIG. 4 is a diagram illustrating details of a dense local regression network 250 in accordance with certain embodiments. The dense local regression network 250 can generate box offset information 251 comprising dense box offsets 401 for a given candidate proposal. The dense local regression network 250 can regress any real number offset and, therefore, is not limited to a quantized set of key points within a fixed region.

As mentioned above, the traditional regression in Faster R-CNN predicts a single global offset for a given candidate proposal 235. Different from traditional regression, the dense local regression network 250 yields multiple box offsets 401 for a given candidate proposal 235. Further, the binary overlap predictions 252 generated by the dense local regression network 250 reduces the influence of background local features on the final box regression. Moreover, by using a fully convolutional network, the dense local regression network 250 can more accurately localize an object 135 in an image 130 due to its ability to regress any real number offset, and it is not limited to a quantized set of key points within a fixed region-of-interest. In addition, the dense local regression network 250 does not require deconvolution operations for bounding box regression to increase the spatial resolution, thereby avoiding the additional computational overhead.

Returning to FIG. 3, the discriminative RoI pooling network 270 of the classification network 260 can improve on deformable RoI pooling approaches. First, the discriminative RoI pooling network 270 can generate a light-weight offset prediction (e.g., via offset prediction function 271) using only one-fourth of the parameters that are required for offset prediction in deformable RoI pooling. The offset prediction utilized by deformable RoI pooling employs an RoIAlign operation to obtain features from k×k sub-regions and passes these features through three fully connected layers. In contrast, the light-weight offset prediction can be generated by the discriminative RoI pooling network 270 by only using a $$\frac{k}{2} \times \frac{k}{2}$$

sized RoIAlign followed by two fully connected layers and, thus, is "light-weight" due to smaller input vector. Another improvement of the discriminative RoI pooling network 270 relates to the adaptive weighted pooling function 272, which is described in further detail below.

After offset prediction is performed, the standard deformable RoI pooling employs a RoIAlign operation, where all four sampling points obtained within each sub-region are averaged by assigning them equal weights. In contrast, the discriminative RoI pooling network 270 can be configured to execute an adaptive weighted pooling function 272 that adaptively assigns higher weights to discriminative sampling points. For example, RoIAlign features having four sampling points, i.e., $F \in R^{2k \times 2k}$, can be used to predict a corresponding weight $W(F) \in R^{2k \times 2k}$, which indicates the discriminative ability of four sampling points inside all k×k spatial sub-regions. Four sampling points ($s^1/_1, s^2/_1, s^3/_1, s^4/_1$) of a sub-region and their corresponding adaptive weights ($w^1/_1, w^2/_1, w^3/_1, w^4/_1$) are shown in Section (c) of FIG. 2. In certain embodiments, weighted RoI feature $\tilde{F}$ of a candidate proposal can be obtained by:

$$\tilde{F} = W(F) \odot F, \quad (4)$$

where $\odot$ is the Hadamard product.

Instead of using a fixed weight, the weight W(F) can be computed from G using convolution operations. Consequently, average pooling with stride two on $\tilde{F}$ can be utilized to obtain a discriminative RoI feature with size k×k. The discriminative RoI pooled feature of a candidate proposal 235 can be treated as a single global vector followed by two fully-connected layers to obtain a classification score 273 of the candidate proposal 235. Moreover, because the predicted offsets sample sub-regions within the candidate proposal 235 as well its surroundings in discriminative RoI pooling, the extracted features are likely to contain information relevant to both the object and its context, which can further improve the classification performance.

For each proposal 235, the classification score 273 generated by the discriminative RoI pooling network 270 can represent a score indicating the probability of a particular class in the proposal 235. For example, given a proposal 235 containing an object in category $c_i$ with C possible object categories in a dataset, the $i^{th}$ element of the C dimensional classification score vector can be assigned the highest value.

The proposed architecture 300 and techniques for performing object detection, localization, and classification can be extended to instance segmentation by modifying the dense local regression network 250. Instead of assuming all regions inside the ground-truth bounding-box G belong to the object, ground-truth instance masks can be used to label local features $p_i \in P$ in Equation 3. As a result, the mask-based ground-truth binary overlap m can be used to train the binary overlap prediction $\hat{m}$ and the offset prediction in the dense local regression network 250. During inference, the binary overlap prediction $\hat{m}$ can provide the instance mask prediction. Further, due to the need for precise localization of object pixels in performing instance segmentation, two deconvolutional layers can be added to the dense local regression network 250 in order to increase the spatial resolution by four times (i.e., from 7×7 to 28×28).

Extensive experiments conducted on two object detection benchmarks,

MS COCO and UAVDT, demonstrate that the object detection and classification techniques described herein outperform existing techniques in many respects. The configuration of the architecture during the experiments is described below, and configuration can be used in certain embodiments.

The input images 130 can be resized during training and testing such that the shorter edge is 800 pixels. In certain embodiments, one or more ResNet models (e.g., ResNet50 and ResNet101) configured with a feature pyramid network (FPN) can be incorporated into the architecture 300 as backbone 303 of the model. The region proposal network 230 can be used to generate candidate object proposals with the standard settings. For each image, 256 anchors can be sampled by keeping a 1:1 positive to negative anchor ratio with anchors spanning 5 scales and 3 aspect ratios and IoU thresholds 0.7 and 0.3 for positive and negative anchors, respectively. All RoIs with a ground-truth overlap greater than 0.5 can be considered as positive samples. From each image, 512 RoIs can be sampled by keeping a 1:3 positive to negative ratio, and these sampled RoIs can be used to train the classification network 260, including the discriminative RoI pooling network 270. The object localization network 240, including the dense local regression network 250, can be trained only using positive RoIs. Eight convolutions of size 3×3 can be used in dense local regression and a pooling size of 7×7 (where k=7) for both classification and dense local regression. The architecture can be trained on 8 GPUs (2 images per GPU) and can adopt stochastic gradient descent (SGD) for training optimization, where the weight decay is 0.0001 and the momentum is 0.9. A 2×training scheme can be adopted for use with MS COCO. In certain embodiments, no data augmentation is necessary, but horizontal flipping may be applied in some cases. The same strategy as employed by Grid R-CNN plus can be used at inference.

Figure 5:
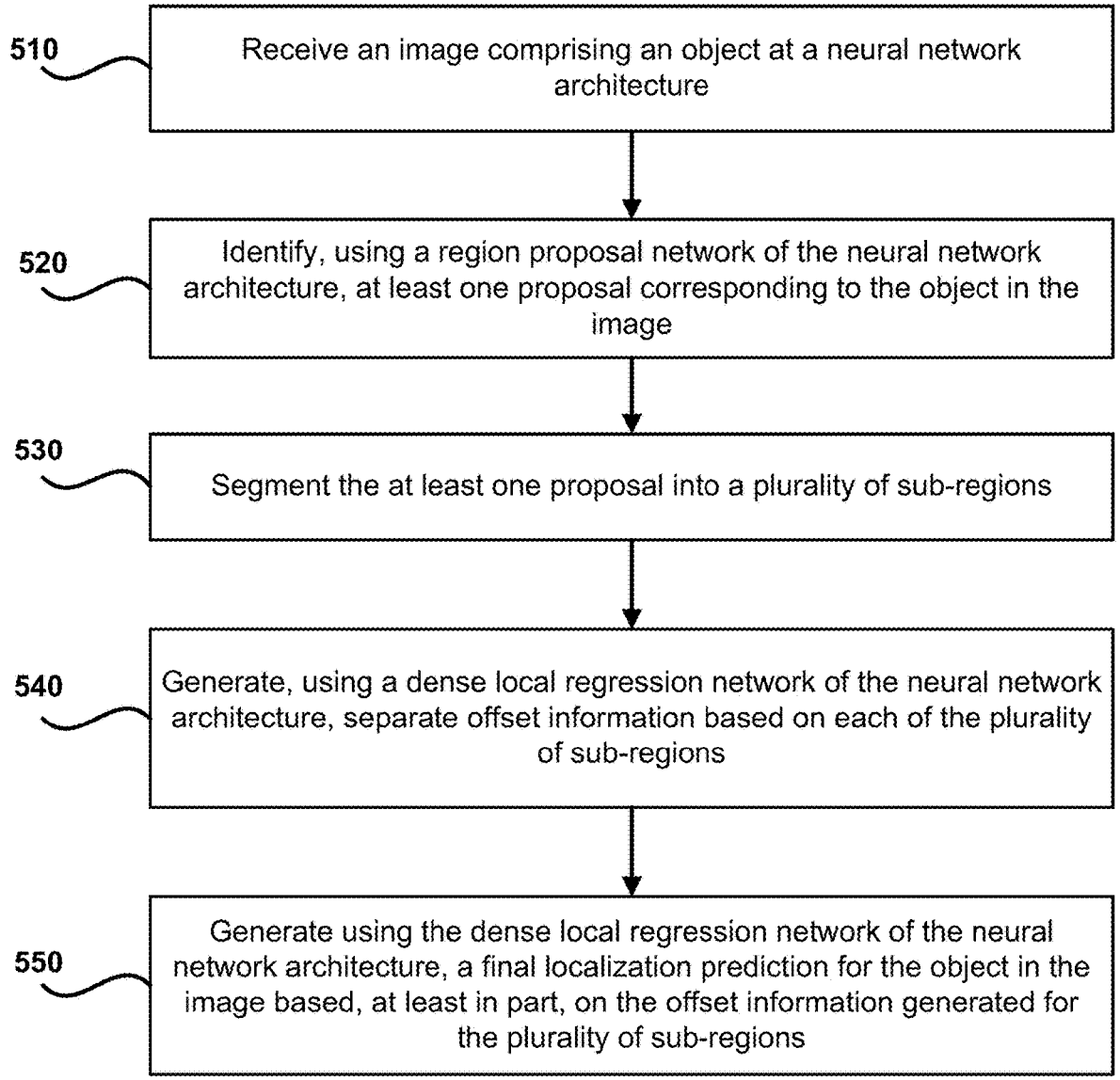
FIG. 5 is a flow chart of an exemplary method according to certain embodiments.

FIG. 5 illustrates a flow chart for an exemplary method 500 according to certain embodiments. Method 500 is merely exemplary and is not limited to the embodiments presented herein. Method 500 can be employed in many different embodiments or examples not specifically depicted or described herein. In some embodiments, the steps of method 500 can be performed in the order presented. In other embodiments, the steps of method 500 can be performed in any suitable order. In still other embodiments, one or more of the steps of method 500 can be combined or skipped. In many embodiments, computer vision system 150 can be suitable to perform method 500 and/or one or more of the steps of method 500. In these or other embodiments, one or more of the steps of method 500 can be implemented as one or more computer instructions configured to run at one or more processing modules (e.g., processor 202) and configured to be stored at one or more non-transitory memory storage modules (e.g., storage device 201). Such non-transitory memory storage modules can be part of a computer system such as computer vision system 150, system 100, and/or system architecture 300.

At step 510, an image 130 comprising an object 135 is received at a neural network architecture 140. The image 130 may comprise a single object 135 or a plurality of objects 135. The image 130 may be received over a network 190 from a computing device 110, or provided directly to a neural network architecture 140 by a computing device 110 that hosts the neural network architecture 140. The neural network architecture 140 may be integrated into, or communicate with, a surveillance system, an autonomous vehicle system, a traffic control system, an image editing application, and/or another system or application that can benefit from object detection, object localization, object classification, and/or instance segmentation functions.

At step 520, a region proposal network 230 of the neural network architecture 140 identifies at least one proposal 235 corresponding to the object 135 in the image 130. In certain embodiments, the region proposal network 230 can be implemented with an off-the-shelf deep learning network, such as the RPN in Faster R-CNN and/or other similar network. The region proposal network 230 can be configured to analyze images 130 and generate multiple proposals 235 corresponding to potential locations of target objects in each of the images 130. The at least one proposal 235 may correspond to a subset or portion of an image 130 that potentially includes the object 130.

At step 530, the at least one proposal 235 is segmented into a plurality of sub-regions. For example, for each proposal 235 received from the region proposal network 230, the proposal 235 may be divided into multiple sub-regions.

At step 540, separate offset information 251 is generated based on each of the plurality of sub-regions using a dense local regression network 250 of the neural network architecture 140. For each sub-region, the offset information 251 can predict the distance of the sub-region to a bounding box and/or a bounding box surrounding the instance mask for the object 135. The offset information 251 can include dense offset information 251 comprising multiple offset predictions for identifying the object in the at least one proposal 235. In certain embodiments, the offset information 251 for each sub-region may include box offset information that can be used to predict the left, right, top, and bottom portions of a bounding box 161 corresponding to the object 135 in the image 130. In certain embodiments, the offset information 251 for each sub-region may include information that identifies or predicts locations of pixel-level annotations or bounding box boundaries of the instance mask of the object 135 in the image 130.

At step 550, a final localization prediction 280 for the object 135 in the image 130 is generated using the dense local regression network 250 based, at least in part, on the offset information 251 generated for the plurality of sub-regions. In certain embodiments, generating the final localization prediction 280 can include averaging the offset information 251 generated for sub-regions that are predicted to belong to the object 135 (and not to the background portion 131 of the image 130). For embodiments that utilize bounding boxes 161 to localize objects 135 in images 130, the final localization prediction 280 generated by the dense local regression network 250 can include a bounding box prediction 281 for predicting a location of a bounding box 161 corresponding to the object 135. For embodiments that utilize instance segmentation functions to localize objects 135 in images 130, the final localization prediction 280 generated by the dense local regression network 250 can include an instance mask prediction 282 for predicting a location of an instance mask 162 identifying the object 135.

While various novel features of the invention have been shown, described, and pointed out as applied to particular embodiments thereof, it should be understood that various omissions and substitutions, and changes in the form and details of the systems and methods described and illustrated, may be made by those skilled in the art without departing from the spirit of the invention. Amongst other things, the steps in the methods may be carried out in different orders in many cases where such may be appropriate. Those skilled in the art will recognize, based on the above disclosure and an understanding of the teachings of the invention, that the particular hardware and devices that are part of the system described herein, and the general functionality provided by and incorporated therein, may vary in different embodiments of the invention. Accordingly, the description of system components are for illustrative purposes to facilitate a full and complete understanding and appreciation of the various aspects and functionality of particular embodiments of the invention as realized in system and method embodiments thereof. Those skilled in the art will appreciate that the invention can be practiced in other than the described embodiments, which are presented for purposes of illustration and not limitation. Variations, modifications, and other implementations of what is described herein may occur to those of ordinary skill in the art without departing from the spirit and scope of the present invention and its claims.

What is claimed is:

1. A computer vision system comprising:
one or more computing devices comprising one or more processors and one or more non-transitory storage devices for storing instructions, wherein execution of the instructions by the one or more processors causes the one or more computing devices to:
receive an image comprising an object at a neural network architecture;
identify, using a region proposal network of the neural network architecture, at least one proposal corresponding to the object in the image;
segment the at least one proposal into a plurality of sub-regions, a first group of sub-regions are predicted to belong to the object in the image and a second group of sub-regions are predicted to belong to a background portion of the image;
generate, using a dense local regression network of the neural network architecture, separate offset information based on each of the plurality of sub-regions, wherein the offset information for each sub-region comprises a separate prediction for localizing the object in the image, the dense local regression network is configured to generate binary overlap predictions that predict whether the plurality of sub-regions belong to the object in the image or the background portion of the image; and
generate, using the dense local regression network of the neural network architecture, a final localization prediction for the object in the image based, at least in part, on the offset information generated for the plurality of sub-regions, the offset information utilized to generate the final localization prediction only includes the offset information associated with the first group of sub-regions and does not include the offset information associated with the second group of sub-regions.

2. The computer vision system of claim 1, wherein generating the final localization prediction for the object in the image includes averaging the offset information from the first group of sub-regions.

3. The computer vision system of claim 1, wherein:
the neural network architecture includes a discriminative region-of-interest (RoI) pooling network; and
the discriminative RoI pooling network is configured to classify the at least one proposal in the image.

4. The computer vision system of claim 3, wherein classifying the at least one proposal in the image includes:
segmenting the at least one proposal into a second group of sub-regions; executing an offset prediction function to predict offsets corresponding to the second group of sub-regions;
analyzing features included the second group of sub-regions; and
executing an adaptive weight pooling function to assign weights to the features.

5. The computer vision system of claim 4, wherein classifying the at least one proposal in the image further includes:
 generating a classification score for the at least one proposal indicating a probability that the at least one proposal includes an object associated with a particular class or label.

6. The computer vision system of claim 1, wherein:
 the offset information generated by the dense local regression network includes separate predictions for a location of a bounding box to localize the object in the image; and
 the final localization prediction includes a final prediction location of the bounding box.

7. The computer vision system of claim 1, wherein:
 the offset information generated by the dense local regression network includes separate predictions for a location of an instance mask to localize the object in the image; and
 the final localization prediction includes a final prediction location of the instance mask utilized to identify the object.

8. The computer vision system of claim 1, wherein the computer vision system is integrated into, or communicates with, one or more of: a surveillance system, a satellite imaging system, an unmanned aerial vehicle system, an autonomous vehicle system, a traffic control system, or an image editing application.

9. A method implemented via execution of computing instructions configured to run at one or more processors and configured to be stored at non-transitory computer-readable media, the method comprising:
 receiving an image at a neural network architecture;
 identifying, using a region proposal network of the neural network architecture, at least one proposal corresponding to an object in the image;
 segmenting the at least one proposal into a plurality of sub-regions, a first group of sub-regions are predicted to belong to the object in the image and a second group of sub-regions are predicted to belong to a background portion of the image;
 generating, using a dense local regression network of the neural network architecture, separate offset information based on each of the plurality of sub-regions, wherein the offset information for each sub-region comprises a separate prediction for localizing the object in the image, the dense local regression network is configured to generate binary overlap predictions that predict whether the plurality of sub-regions belong to the object in the image or the background portion of the image; and
 generating, using the dense local regression network of the neural network architecture, a final localization prediction for the object in the image based, at least in part, on the offset information generated for the plurality of sub-regions, the offset information utilized to generate the final localization prediction only includes the offset information associated with the first group of sub-regions and does not include offset information associated with the second group of sub-regions.

10. The method of claim 9, wherein generating the final localization prediction for the object in the image includes averaging the offset information from the first group of sub-regions.

11. The method of claim 9, wherein:
 the neural network architecture includes a discriminative region-of-interest (RoI) pooling network; and
 the discriminative RoI pooling network is configured to classify the at least one proposal in the image.

12. The method of claim 11, wherein classifying the at least one proposal in the image includes:
 segmenting the at least one proposal into a second group of sub-regions;
 executing an offset prediction function to predict offsets corresponding to the second group of sub-regions;
 analyzing features included the second group of sub-regions; and
 executing an adaptive weight pooling function to assign weights to the features.

13. The method of claim 12, wherein classifying the at least one proposal in the image further includes:
 generating a classification score for the at least one proposal indicating a probability that the at least one proposal includes an object associated with a particular class or label.

14. The method of claim 9, wherein:
 the offset information generated by the dense local regression network includes separate predictions for a location of a bounding box to localize the object in the image; and
 the final localization prediction includes a final prediction location of the bounding box.

15. The method of claim 9, wherein:
 the offset information generated by the dense local regression network includes separate predictions for a location of an instance mask to localize the object in the image; and
 the final localization prediction includes a final prediction location of the instance mask utilized to identify the object.

16. A computer program product comprising a non-transitory computer-readable medium including instructions for causing a computer to:
 receive an image comprising an object at a neural network architecture;
 identify, using a region proposal network of the neural network architecture, at least one proposal corresponding to the object in the image;
 segment the at least one proposal into a plurality of sub-regions, a first group of sub-regions are predicted to belong to the object in the image and a second group of sub-regions are predicted to belong to a background portion of the image;
 generate, using a dense local regression network of the neural network architecture, separate offset information based on each of the plurality of sub-regions, wherein the offset information for each sub-region comprises a separate prediction for localizing the object in the image, the dense local regression network is configured to generate binary overlap predictions that predict whether the plurality of sub-regions belong to the object in the image or the background portion of the image; and
 generate, using the dense local regression network of the neural network architecture, a final localization prediction for the object in the image based, at least in part, on the offset information generated for the plurality of sub-regions, the offset information utilized to generate the final localization prediction only includes the offset information associated with the first group of sub-regions and does not include offset information associated with the second group of sub-regions.

17. A computer vision system comprising:
one or more computing devices comprising one or more processors and one or more non-transitory storage devices for storing instructions, wherein execution of the instructions by the one or more processors causes the one or more computing devices to:
receive an image comprising an object at a neural network architecture;
identify, using a region proposal network of the neural network architecture, at least one proposal corresponding to the object in the image, the neural network architecture includes a discriminative region-of-interest (RoI) pooling network, the discriminative RoI pooling network is configured to classify the at least one proposal in the image by:
  segmenting the at least one proposal into a second group of sub-regions;
  executing an offset prediction function to predict offsets corresponding to the second group of sub-regions;
  analyzing features included in the second group of sub-regions; and
  executing an adaptive weight pooling function to assign weights to the features;
segment the at least one proposal into a plurality of sub-regions;
generate, using a dense local regression network of the neural network architecture, separate offset information based on each of the plurality of sub-regions, wherein the offset information for each sub-region comprises a separate prediction for localizing the object in the image; and
generate, using the dense local regression network of the neural network architecture, a final localization prediction for the object in the image based, at least in part, on the offset information generated for the plurality of sub-regions.

18. The computer vision system of claim 17, wherein classifying the at least one proposal in the image further includes:
generating a classification score for the at least one proposal indicating a probability that the at least one proposal includes an object associated with a particular class or label.

19. A method implemented via execution of computing instructions configured to run at one or more processors and configured to be stored at non-transitory computer-readable media, the method comprising:
receiving an image at a neural network architecture;
identifying, using a region proposal network of the neural network architecture, at least one proposal corresponding to an object in the image, the neural network architecture includes a discriminative region-of-interest (RoI) pooling network, the discriminative RoI pooling network is configured to classify the at least one proposal in the image by:
  segmenting the at least one proposal into a second group of sub- regions;
  executing an offset prediction function to predict offsets corresponding to the second group of sub-regions;
  analyzing features included in the second group of sub-regions; and
  executing an adaptive weight pooling function to assign weights to the features;
segmenting the at least one proposal into a plurality of sub-regions;
generating, using a dense local regression network of the neural network architecture, separate offset information based on each of the plurality of sub-regions, wherein the offset information for each sub-region comprises a separate prediction for localizing the object in the image; and
generating, using the dense local regression network of the neural network architecture, a final localization prediction for the object in the image based, at least in part, on the offset information generated for the plurality of sub-regions.

20. The method of claim 19, wherein classifying the at least one proposal in the image further includes:
generating a classification score for the at least one proposal indicating a probability that the at least one proposal includes an object associated with a particular class or label.

* * * * *